(12) United States Patent
Boday et al.

(10) Patent No.: US 9,688,853 B2
(45) Date of Patent: Jun. 27, 2017

(54) FLAME-RETARDANT COPOLYMERS

(71) Applicant: International Business Machines Corporation, Armonk, NY (US)

(72) Inventors: Dylan J. Boday, Tucson, AZ (US); Joseph Kuczynski, North Port, FL (US); Timothy C. Mauldin, San Diego, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/831,001

(22) Filed: Aug. 20, 2015

(65) Prior Publication Data

US 2017/0029616 A1  Feb. 2, 2017

Related U.S. Application Data

(63) Continuation of application No. 14/809,640, filed on Jul. 27, 2015, now Pat. No. 9,540,568.

(51) Int. Cl.

| | |
|---|---|
| *C08L 67/04* | (2006.01) |
| *C08L 69/00* | (2006.01) |
| *C08L 25/14* | (2006.01) |
| *C08L 43/02* | (2006.01) |
| *C09K 21/14* | (2006.01) |
| *C08F 212/08* | (2006.01) |
| *C08F 220/14* | (2006.01) |
| *C08F 230/02* | (2006.01) |
| *C08F 236/14* | (2006.01) |
| *C08L 47/00* | (2006.01) |
| *C08F 220/10* | (2006.01) |
| *C08L 33/12* | (2006.01) |
| *C08L 25/10* | (2006.01) |

(52) U.S. Cl.
CPC ............ *C08L 67/04* (2013.01); *C08F 212/08* (2013.01); *C08F 220/10* (2013.01); *C08F 230/02* (2013.01); *C08F 236/14* (2013.01); *C08L 25/14* (2013.01); *C08L 33/12* (2013.01); *C08L 43/02* (2013.01); *C08L 47/00* (2013.01); *C08L 69/00* (2013.01); *C09K 21/14* (2013.01); *C08L 2201/02* (2013.01)

(58) Field of Classification Search
CPC .... C08F 212/08; C08F 220/14; C08F 230/02; C08F 236/14; C08L 25/14; C08L 43/02; C08L 2201/02
USPC .................................. 526/274, 278; 525/287
See application file for complete search history.

(56) References Cited

U.S. PATENT DOCUMENTS

| | | | | |
|---|---|---|---|---|
| 2,743,261 A | * | 4/1956 | Coover, Jr. et al. .... | C08F 30/02 524/547 |
| 4,035,571 A | * | 7/1977 | Brunner ................. | C08F 230/02 260/DIG. 24 |
| 5,292,817 A | * | 3/1994 | Grey ..................... | C08F 255/06 525/259 |
| 5,439,999 A | * | 8/1995 | Archer .................. | C08F 230/02 526/278 |
| 8,871,858 B2 | | 10/2014 | Volkers et al. | |
| 8,871,865 B2 | | 10/2014 | Jansen et al. | |
| 2008/0242795 A1 | * | 10/2008 | Jang ..................... | C08F 220/18 524/547 |
| 2015/0094414 A1 | | 4/2015 | Lee et al. | |
| 2015/0099845 A1 | | 4/2015 | Daga et al. | |

FOREIGN PATENT DOCUMENTS

| | | |
|---|---|---|
| CA | 2679136 C | 9/2008 |
| CN | 104448758 A | 3/2015 |
| CN | 104479221 A | 4/2015 |
| CN | 104479324 A | 4/2015 |
| EP | 1940958 B1 | 1/2015 |
| WO | 2013189676 A | 12/2013 |

OTHER PUBLICATIONS

List of IBM Patents or Patent Applications Treated as Related.

* cited by examiner

*Primary Examiner* — Fred M Teskin
(74) *Attorney, Agent, or Firm* — Patterson + Sheridan, LLP

(57) ABSTRACT

In an example, a process includes combining a methyl methacrylate monomer, a butadiene monomer, a styrene monomer, and an organophosphate monomer. The process includes initiating a polymerization reaction to form a flame-retardant copolymer.

15 Claims, 3 Drawing Sheets

FLAME-RETARDANT COPOLYMERS

I. CROSS REFERENCE TO RELATED APPLICATIONS

This application is a continuation application and claims priority from U.S. patent application Ser. No. 14/809,640, entitled "FLAME-RETARDANT COPOLYMERS," filed on Jul. 27, 2015, which is incorporated herein in its entirety.

II. FIELD OF THE DISCLOSURE

The present disclosure relates generally to flame-retardant copolymers.

III. BACKGROUND

Plastics are typically derived from a finite and dwindling supply of petrochemicals, resulting in price fluctuations and supply chain instability. Replacing non-renewable petroleum-based polymers with polymers derived from renewable resources may be desirable. However, there may be limited alternatives to petroleum-based polymers in certain contexts. To illustrate, particular plastics performance standards may be specified by a standards body or by a regulatory agency. In some cases, alternatives to petroleum-based polymers may be limited as a result of challenges associated with satisfying particular plastics performance standards.

IV. SUMMARY OF THE DISCLOSURE

According to an embodiment, a process is disclosed that includes combining a methyl methacrylate monomer, a butadiene monomer, a styrene monomer, and an organophosphate monomer. The process further includes initiating a polymerization reaction to form a flame-retardant copolymer.

According to another embodiment, a polymeric impact modifier is disclosed. The polymeric impact modifier includes a flame-retardant methyl methacrylate-butadiene-styrene (MBS) copolymer having a polymer chain that includes an organophosphate material.

According to another embodiment, a polymeric blend is disclosed. The polymeric blend includes a first polymeric material and a second polymeric material. The first polymeric material includes a flame-retardant MBS copolymer having a polymer chain that includes an organophosphate material.

One advantage of the present disclosure is the ability to impart flame-retardant characteristics to a copolymer by chemically binding phosphorus to a polymer chain. Another advantage of the present disclosure is the ability to add the flame-retardant copolymer to another polymeric material (e.g., a polylactic acid (PLA) homopolymer or a polymeric blend that includes a PLA polymer) in order to improve the impact resistance characteristics of the polymeric material without degrading the flame retardancy characteristics of the polymeric material.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

V. BRIEF DESCRIPTION OF THE DRAWINGS

VI. DETAILED DESCRIPTION

Figure 1:
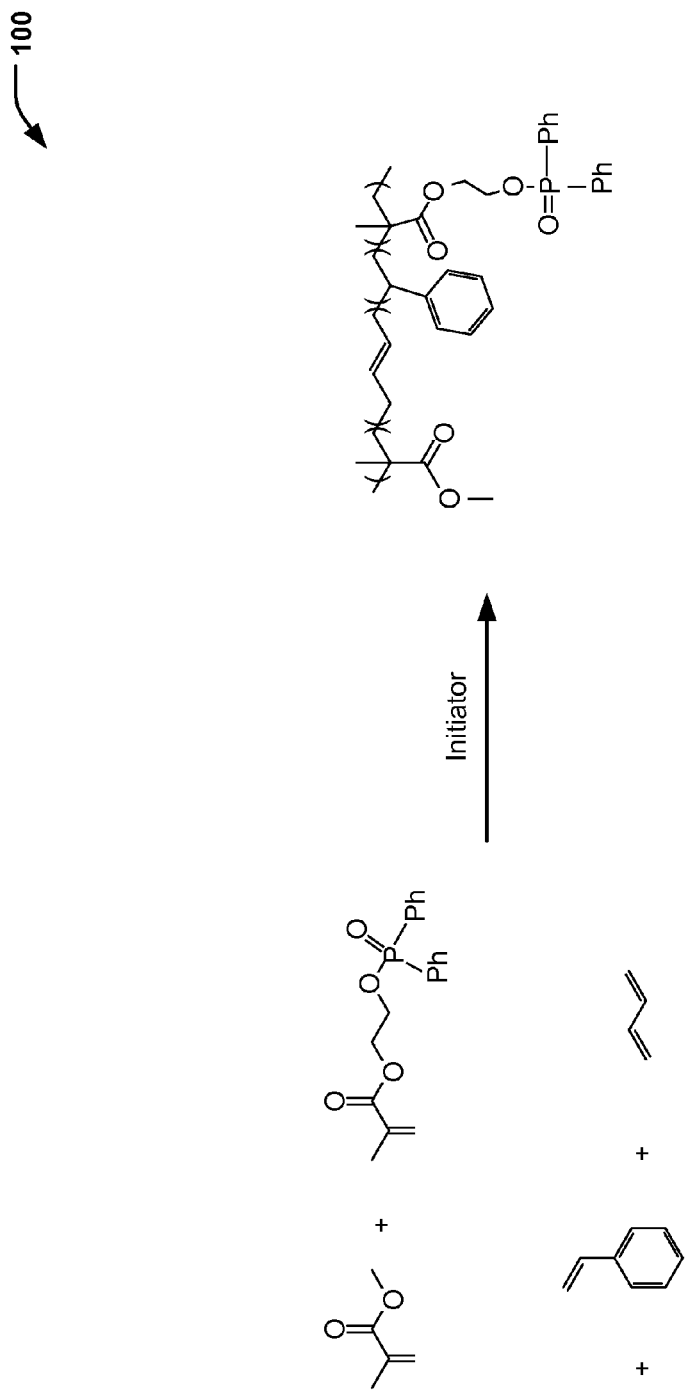
FIG. 1 is a chemical reaction diagram showing the preparation of a flame-retardant copolymer, according to one embodiment.

The present disclosure relates to production of flame-retardant copolymers for use as polymeric impact modifiers. In some cases, a polymeric material derived from renewable resources may have unacceptable impact resistance characteristics for use in various contexts (e.g., as enclosures surrounding computing devices). Illustrative, non-limiting examples of polymeric materials derived from renewable resources include polylactic acid (PLA) homopolymers, polymeric blends that include a PLA polymer and a polycarbonate (PC) polymer (also referred to as a PLA/PC blend), polybutylene succinate (PBS) polymers, and polyhydroxy alkanoate (PHA) polymers. In order to improve the impact resistance characteristics of such polymeric materials, the flame-retardant copolymers of the present disclosure may be utilized as additives without degradation of flame retardancy characteristics that may be associated with other polymeric impact modifiers.

The flame-retardant copolymers of the present disclosure include flame-retardant methyl methacrylate-butadiene-styrene (MBS) copolymers having a polymer chain that includes an organophosphate material. The present disclosure describes processes of producing such copolymers by polymerizing a methyl methacrylate monomer, a butadiene monomer, a styrene monomer, and an organophosphate monomer. For example, the organophosphate monomer may include a phosphorus-containing acrylic monomer, a phosphorus-containing styrenic monomer, or a combination thereof (among other alternatives). Alternatively or additionally, an acrylic, styrenic, or vinylic monomer having flame retardant functionalities (e.g., phosphorus, halogens, etc.) may be suitable for use as a monomer to form a flame-retardant MBS copolymer.

Chemically binding phosphorus to a polymer chain may result in a polymer with "inherent" flame-retardancy characteristics. The inherent flame retardancy characteristics of the copolymers of the present disclosure may allow the copolymers to be used as impact modifying additives without flame retardancy degradation that may be associated with other impact modifiers (e.g., MBS-based impact modifiers that do not include phosphorus). As an example, the flame-retardant copolymers of the present disclosure may have a first impact resistance value that is greater than a second impact resistance value of a PLA-based polymer (e.g., a PLA homopolymer or a PLA/PC blend, among other alternatives). As another example, the flame-retardant copolymers of the present disclosure may have a first flame retardance value that is greater than a second flame retardance value of an impact modifier that may improve impact resistance characteristics of a PLA-based polymer but degrade flame retardance characteristics of the PLA-based polymer.

In some cases, a polymeric impact modifier that includes the flame-retardant copolymer(s) of the present disclosure may be used to form a polymeric blend with acceptable impact resistance properties that also satisfies a plastics flammability standard. As an illustrative, non-limiting example, the plastics flammability standard may be specified by Underwriters Laboratories® (referred to as "UL" herein), such as UL 94, entitled "Standard for Safety of Flammability of Plastic Materials for Parts in Devices and Appliances testing." The UL 94 standard defines various criteria that may be used to classify a particular plastic based on a degree of flame-retardancy. To illustrate, in order for a plastic to be assigned a "V-1" classification, UL 94 specifies that burning stops within 30 seconds on a vertical specimen and that drips of particles are allowed as long as the particles are not inflamed. In order for a plastic to be assigned a "V-0" classification, UL 94 specifies that burning stops within 10 seconds on a vertical specimen and that drips of particles are allowed as long as the particles are not inflamed. In some cases, testing may be conducted on a 5-inch×0.5-inch (12.7 cm×1.27 cm) specimen of a minimum approved thickness (according to the UL 94 standard). It will be appreciated that the UL 94 V-1/V-0 plastics flammability standards are for example purposes only. Alternative or additional plastics flammability standard(s) may be applicable in various contexts.

Thus, the present disclosure describes copolymers with inherent flame retardant characteristics resulting from the presence of an organophosphate material in a polymer chain. The inherent flame retardant characteristics of the copolymers of the present disclosure may allow the copolymers to be used as additives to improve impact resistance properties of a polymeric material (e.g., a PLA/PC blend) without degrading the ignition resistance properties of the polymeric material.

Referring to FIG. 1, a chemical reaction diagram 100 illustrates the preparation of a flame-retardant copolymer, according to one embodiment. FIG. 1 illustrates that a flame-retardant copolymer may be formed by combining a methyl methacrylate monomer, a butadiene monomer, a styrene monomer, and an organophosphate monomer, and initiating a polymerization reaction. In the particular embodiment illustrated in FIG. 1, the organophosphate monomer includes a phosphorus-containing acrylic monomer. As further described herein with respect to FIG. 2, the organophosphate monomer may include a phosphorus-containing styrenic monomer. Further, it will be appreciated that multiple organophosphate monomers (e.g., a phosphorus-containing acrylic monomer and a phosphorus-containing styrenic monomer) and/or other phosphorus-containing monomers that undergo a specific type of polymerization reaction (e.g., radical polymerization) may be used.

The left side of the chemical reaction diagram 100 illustrates a particular embodiment in which four different monomers are utilized in the polymerization process. In the example of FIG. 1, the four monomers include a first acrylic monomer (methyl 2-methylpropenoate, referred to herein as "methyl methacrylate"), a butadiene monomer (1,3 butadiene, referred to herein as "butadiene"), a styrenic monomer (phenylethene, referred to herein as "styrene"), and a second acrylic monomer that includes phosphorus (referred to herein as a "phosphorus-containing acrylic monomer"). The right side of the chemical reaction diagram 100 illustrates that polymerization of the monomers results in an MBS copolymer having a polymer chain that includes an organophosphate material. A thermal initiator, an ultraviolet (UV) initiator, or a radical polymerization technique may be utilized. For illustrative purposes only, the example copolymer of FIG. 1 includes a single unit associated with each of the four different monomers. It will be appreciated that the copolymer may include an alternative number and/or arrangement of units based on, for example, proportions of reactants used.

In the particular embodiment illustrated in FIG. 1, the phosphorus-containing acrylic monomer includes a diphenyl phosphate material (with the phenyl rings identified as "Ph" in FIG. 1 for illustrative purposes only). Alternatively or additionally, the phosphorus-containing acrylic monomer may include one or more other phosphorus-containing acrylic monomers. In a particular embodiment, the phosphorus-containing acrylic monomer of FIG. 1 may be formed via a chemical reaction of hydroxyethyl methacrylate and diphenylphosphinic chloride.

In a particular embodiment, a polymeric impact modifier may include at least the flame-retardant copolymer illustrated in FIG. 1. The polymeric impact modifier may be used to improve an impact resistance value of another polymeric material. As an illustrative, non-limiting example, the flame-retardant copolymer of FIG. 1 may have a first impact resistance value that is greater than a second impact resistance value of a PLA homopolymer (or a PLA/PC blend, among other alternatives). As such, the addition of the flame-retardant copolymer of FIG. 1 to a PLA homopolymer or a PLA/PC blend may result in a polymeric blend with improved impact resistance characteristics.

The flame-retardant copolymer of FIG. 1 may be used to improve impact resistance properties without flame retardancy degradation that may be associated with other impact modifiers (e.g., MBS-based impact modifiers that do not include flame-retardant functionalities). To illustrate, polymerization of the acrylic monomer, the butadiene monomer, and the styrene monomer illustrated in FIG. 1, without the phosphorus-containing acrylic monomer illustrated in FIG. 1, results in an MBS copolymer that does not include phosphorus. By contrast, FIG. 1 illustrates that a phosphorus-containing monomer (e.g., a phosphorus-containing acrylic monomer) results in an MBS copolymer having a polymer chain that includes an organophosphate material. The flame-retardant copolymer illustrated in FIG. 1 may have a first flame retardance value that is greater than a second flame retardance value of an MBS copolymer that does not include phosphorus.

An amount of phosphorus in the flame-retardant copolymer may be adjusted such that, when used as a polymeric impact modifier, the flame-retardant copolymer may improve impact resistance characteristics without flame retardancy degradation. In the embodiment illustrated in FIG. 1, the amount of phosphorus in the flame-retardant copolymer may be varied by adjusting the stoichiometry of the reactant materials such that more/less of the phosphorus-containing acrylic monomer is polymerized.

Figure 3:
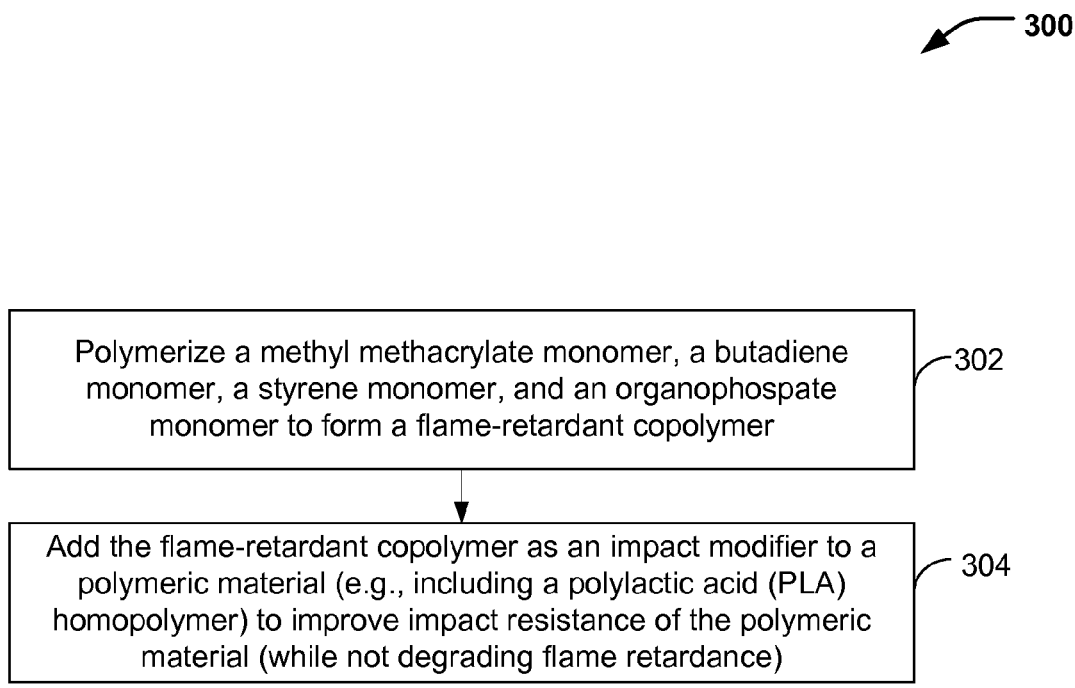
FIG. 3 is a flow diagram showing a particular embodiment of a process of improving impact resistance of a polymeric material by adding a polymeric impact modifier that includes a flame-retardant copolymer.

As described further herein with respect to FIG. 3, the flame-retardant copolymer illustrated in FIG. 1 may be used to form a polymeric blend that satisfies a plastics flammability standard and that provides acceptable impact resistance characteristics. Illustrative, non-limiting examples of plastics flammability standards include the UL 94 V-1 classification and the UL 94 V-0 classification. In order to be assigned the V-1 classification, UL 94 specifies that burning stops within 30 seconds on a vertical specimen and that drips of particles are allowed as long as the particles are not inflamed. In this case, a weight percentage of the flame-retardant copolymer of FIG. 1 that is used as an additive may be adjusted such that the resulting polymeric blend satisfies the UL 94 V-1 standard. As another example, in order to be assigned the V-0 classification, UL 94 specifies that burning stops within 10 seconds on a vertical specimen and that drips of particles are allowed as long as the particles are not inflamed. In this case, a weight percentage of the flame-retardant copolymer of FIG. 1 that is used as an additive may be adjusted such that the resulting polymeric blend satisfies the UL 94 V-0 standard.

With regard to the impact resistance characteristics, in some cases, the polymeric blend that includes the flame-retardant copolymer of FIG. 1 may be compared to a "benchmark" polymeric material, such as a polymeric blend of a polycarbonate polymer and an acrylonitrile butadiene styrene (ABS) polymer (also referred to as a PC/ABS blend). In some cases, a polymeric blend that includes the flame-retardant copolymer of FIG. 1 may be considered to have "acceptable" impact resistance properties when the polymeric blend satisfies an impact resistance threshold that is based on the benchmark polymeric material. To illustrate, an impact resistance characteristic may include a notched izod impact strength. In the case of a PC/ABS blend, the notched izod impact strength may be about 8-12 ft-lb/inch. In this case, the impact resistance properties of the polymeric blend that includes the flame-retardant copolymer of FIG. 1 may be represented as a percentage of the notched izod impact strength of the PC/ABS blend. In a particular embodiment, to be considered acceptable, a notched izod impact strength of a polymeric blend that includes flame-retardant copolymer of FIG. 1 may be not less than 50 percent of the notched impact strength of the PC/ABS blend, such as not less than 60 percent, not less than 70 percent, not less than 80 percent, or not less than 90 percent.

Thus, FIG. 1 illustrates an example of a process of producing a copolymer by polymerizing a methyl methacrylate monomer, a butadiene monomer, a styrene monomer, and an organophosphate monomer (e.g., a phosphorus-containing acrylic monomer). As described further herein with respect to FIG. 3, the copolymer of FIG. 1 may be used as a polymeric impact modifier that improves impact resistance without flame retardancy degradation.

Figure 2:
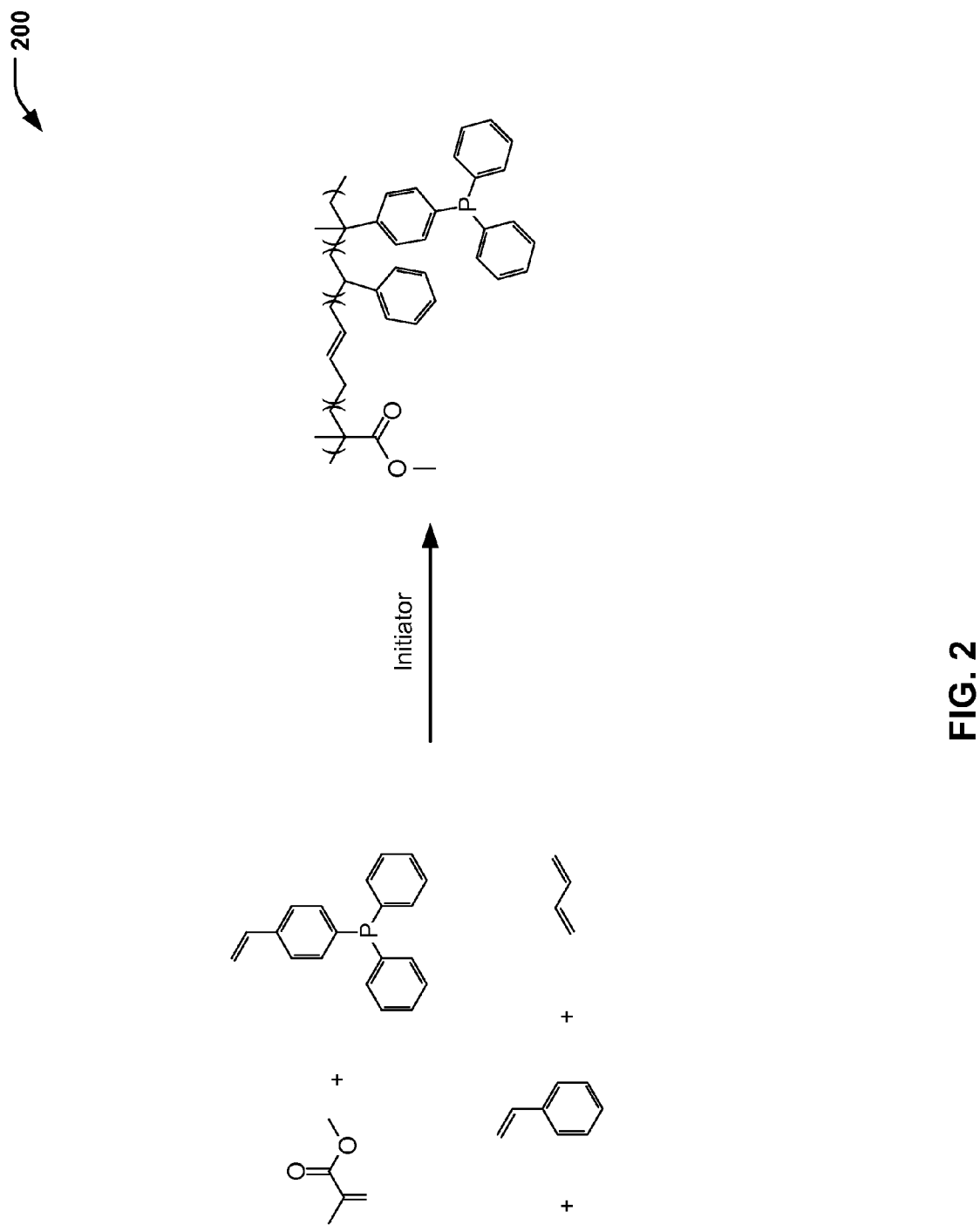
FIG. 2 is a chemical reaction diagram showing the preparation of a flame-retardant copolymer, according to another embodiment.

Referring to FIG. 2, a chemical reaction diagram 200 illustrates the preparation of a flame-retardant copolymer, according to another embodiment. FIG. 2 illustrates that a flame-retardant copolymer may be formed by combining a methyl methacrylate monomer, a butadiene monomer, a styrene monomer, and an organophosphate monomer, and initiating a polymerization reaction. In the particular embodiment illustrated in FIG. 2, the organophosphate monomer includes a phosphorus-containing styrenic monomer.

The left side of the chemical reaction diagram 200 illustrates a particular embodiment in which four different monomers are utilized in the polymerization process. In the example of FIG. 2, the four monomers include an acrylic monomer (methyl methacrylate), a butadiene monomer (butadiene), a first styrenic monomer (styrene), and a second styrenic monomer that includes phosphorus (referred to herein as a "phosphorus-containing styrenic monomer"). The right side of the chemical reaction diagram 200 illustrates that polymerization of the monomers results in an MBS copolymer having a polymer chain that includes an organophosphate material. A thermal initiator, a UV initiator, or a radical polymerization technique may be utilized to form the MBS copolymer. For illustrative purposes only, the example copolymer of FIG. 2 includes a single unit associated with each of the four different monomers. It will be appreciated that the copolymer may include an alternative number and/or arrangement of units based on, for example, proportions of reactants used.

In the particular embodiment illustrated in FIG. 2, the phosphorus-containing styrenic monomer includes 4-(diphenylphosphino)styrene. Alternatively or additionally, the phosphorus-containing styrenic monomer may include one or more other phosphorus-containing styrenic monomers.

In a particular embodiment, a polymeric impact modifier may include at least the flame-retardant copolymer illustrated in FIG. 2. The polymeric impact modifier may be used to improve an impact resistance value of another polymeric material. As an illustrative, non-limiting example, the flame-retardant copolymer of FIG. 2 may have a first impact resistance value that is greater than a second impact resistance value of a PLA homopolymer (or a PLA/PC blend, among other alternatives). As such, the addition of the flame-retardant copolymer of FIG. 2 to a PLA homopolymer or a PLA/PC blend may result in a polymeric blend with improved impact resistance characteristics.

The flame-retardant copolymer of FIG. 2 may be used to improve impact resistance properties without flame retardancy degradation that may be associated with other impact modifiers (e.g., MBS-based impact modifiers that do not include flame-quenching functionalities). To illustrate, polymerization of the acrylic monomer, the butadiene monomer, and the styrene monomer illustrated in FIG. 2, without the phosphorus-containing styrenic monomer illustrated in FIG. 2, results in an MBS copolymer that does not include phosphorus. By contrast, FIG. 2 illustrates that a phosphorus-containing monomer (e.g., a phosphorus-containing styrenic monomer) results in an MBS copolymer having a polymer chain that includes an organophosphate material. The flame-retardant copolymer illustrated in FIG. 2 may have a first flame retardance value that is greater than a second flame retardance value of an MBS copolymer that does not include phosphorus.

An amount of phosphorus in the flame-retardant copolymer may be adjusted such that, when used as a polymeric impact modifier, the flame-retardant copolymer may improve impact resistance characteristics without flame retardancy degradation. In the embodiment illustrated in FIG. 2, the amount of phosphorus in the flame-retardant copolymer may be varied by adjusting the stoichiometry of the reactant materials such that more/less of the phosphorus-containing styrenic monomer is polymerized.

As described further herein with respect to FIG. 3, the flame-retardant copolymer illustrated in FIG. 2 may be used to form a polymeric blend that satisfies a plastics flammability standard and that provides acceptable impact resistance characteristics. As an example, a weight percentage of the flame-retardant copolymer of FIG. 2 that is used as an additive may be adjusted such that the resulting polymeric blend satisfies the UL 94 V-1/V-0 standard(s).

With regard to the impact resistance characteristics, in some cases, the polymeric blend that includes the flame-retardant copolymer of FIG. 2 may be compared to a benchmark polymeric material, such as a PC/ABS blend. In some cases, a polymeric blend that includes the flame-retardant copolymer of FIG. 2 may be considered to have acceptable impact resistance properties when the polymeric blend satisfies an impact resistance threshold that is based on the benchmark polymeric material. To illustrate, the impact resistance properties of the polymeric blend that includes the flame-retardant copolymer of FIG. 2 may be represented as a percentage of a notched izod impact strength of the benchmark polymeric material. In the case of a PC/ABS blend, the notched izod impact strength may be about 8-12 ft-lb/inch. In this case, the impact resistance properties of the polymeric blend that includes the flame-retardant copolymer of FIG. 2 may be represented as a percentage of the notched izod impact strength of the PC/ABS blend. In a particular embodiment, to be considered acceptable, a notched izod impact strength of a polymeric blend that includes flame-retardant copolymer of FIG. 2 may be not less than 50 percent of the notched izod impact strength of the PC/ABS blend, such as not less than 60 percent, not less than 70 percent, not less than 80 percent, or not less than 90 percent.

Thus, FIG. 2 illustrates an example of a process of producing a copolymer by polymerizing a methyl methacrylate monomer, a butadiene monomer, a styrene monomer, and an organophosphate monomer (e.g., a phosphorus-containing styrenic monomer). As described further herein with respect to FIG. 3, the copolymer of FIG. 1 may be used as a polymeric impact modifier that improves impact resistance without flame retardancy degradation.

FIG. 3 is a flow diagram of a particular embodiment of a process 300 of improving impact resistance of a polymeric material by adding a polymeric impact modifier that includes a flame-retardant copolymer.

The process 300 includes polymerizing a methyl methacrylate monomer, a butadiene monomer, a styrene monomer, and an organophosphate monomer to form a flame-retardant copolymer, at 302. As an example, referring to FIG. 1, the organophosphate monomer may include a phosphorus-containing acrylic monomer. As another example, referring to FIG. 2, the organophosphate material may include a phosphorus-containing styrenic monomer. As described further herein with respect to FIGS. 1 and 2, polymerization of the monomers (including the organophosphate monomer) results in a flame-retardant copolymer having a polymeric chain that includes an organophosphate material.

The process 300 includes adding the flame-retardant copolymer as an impact modifier to a polymeric material, at 304. Addition of the flame-retardant copolymer may improve impact resistance of the polymeric material (while not degrading flame retardance). As an example, the flame-retardant copolymer illustrated in FIG. 1 and/or the flame-retardant copolymer illustrated in FIG. 2 may be added to a polymeric material, such as a PLA-based polymer.

In a particular embodiment, an amount of the flame-retardant copolymer that is added as an impact modifier may vary depending on the particular polymeric material, a desired impact resistance value, desired flame retardancy characteristics, or a combination thereof. In some cases, it may be desirable to increase an amount of one or more renewable polymeric materials in a polymeric blend. As an illustrative, non-limiting example, a PLA/PC blend that contains 40 weight percent PLA and 60 weight percent PC may be more desirable than a PLA/PC blend that contains 30 weight percent PLA and 70 weight percent PC (due to the increased amount of the renewable PLA content). In a particular embodiment, an amount of the flame-retardant copolymer that is added to a polymeric material as an impact modifier in order to provide acceptable impact resistance properties and acceptable flame retardance properties may be in a range of 1 weight percent to 20 weight percent, such as in a range of 5 weight percent to 15 weight percent, in a range of 8 weight percent to 12 weight percent, or in a range of 9 weight percent to 11 weight percent.

It will be appreciated that other flame retardant materials, such as phosphorus-based flame-retardant small molecules may also be added to the polymeric blend to provide acceptable flame retardancy characteristics. As an example, for the polymeric blend to be classified as V-1/V-0 under UL 94, the phosphorus-based flame-retardant small molecule additives may represent about 10 weight percent to about 15 weight percent of the polymer matrix. Thus, while the flame retardancy characteristics of the copolymers of the present disclosure may allow the copolymers to be used as impact modifiers without flame retardancy degradation of the polymeric blend, additional material(s) may be utilized in order to satisfy a particular plastics flammability standard.

In the particular embodiment illustrated in FIG. 3, a process of forming a flame-retardant copolymer is identified as operation 302, while a process of adding the flame-retardant copolymer as an impact modifier is identified as operation 304. It will be appreciated that the operations shown in FIG. 3 are for illustrative purposes only and that the operations may be performed by a single entity or by multiple entities. As an example, one entity may form the flame-retardant copolymer, while another entity may form a polymeric blend by adding the flame-retardant copolymer as an impact modifier to another polymeric material.

Thus, FIG. 3 illustrates various operations associated with improving impact resistance properties of a polymeric material (e.g., a PLA homopolymer or a PLA/PC polymeric blend) via the addition of one or more of the flame-retardant copolymers of the present disclosure.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A process comprising:
combining a methyl methacrylate monomer, a butadiene monomer, a styrene monomer, and a phosphorus-containing styrenic monomer, wherein the phosphorus-containing styrenic monomer includes 4-(diphenylphosphino)styrene; and
initiating a polymerization reaction to form a flame-retardant copolymer.

2. A process comprising:
combining a methyl methacrylate monomer, a butadiene monomer, a styrene monomer, and a phosphorus-containing acrylic monomer; and
initiating a polymerization reaction to form a flame-retardant methyl methacrylate-butadiene-styrene (MBS) copolymer.

3. The process of claim 2, wherein the flame-retardant methyl MBS copolymer has a first impact resistance value that is greater than a second impact resistance value of a polylactic acid (PLA) homopolymer.

4. The process of claim 2, wherein the flame-retardant methyl MBS copolymer has a first flame retardance value that is greater than a second flame retardance value of an MBS terpolymer that does not include phosphorus.

5. The process of claim 2, wherein the phosphorus-containing acrylic monomer is formed via a chemical reaction of hydroxyethyl methacrylate and diphenylphosphinic chloride.

6. The process of claim 2, further comprising adding the flame-retardant methyl MBS copolymer to a second polymeric material as an impact modifier.

7. The process of claim 6, wherein the second polymeric material includes a polylactic acid (PLA) homopolymer.

8. The process of claim 6, wherein the second polymeric material includes a polymeric blend, the polymeric blend including a polylactic acid (PLA) polymer.

9. The process of claim 8, wherein the polymeric blend further includes a polycarbonate (PC) polymer.

10. The process of claim 6, wherein addition of the flame-retardant methyl MBS copolymer to the second polymeric material forms a polymeric blend that satisfies a plastics flammability standard.

11. The process of claim 10, wherein the plastics flammability standard includes a burning stop rate of not less than 30 seconds on a vertical specimen.

12. The process of claim 10, wherein the plastics flammability standard includes a burning stop rate of not less than 10 seconds on a vertical specimen.

13. The process of claim 10, wherein the plastics flammability standard allows drips of non-inflamed particles, and wherein the plastics flammability standard does not allow drips of flaming particles.

14. The process of claim 2, wherein a thermal initiator, an ultraviolet (UV) initiator, or a radical polymerization technique is utilized for polymerization.

15. The process of claim 2, wherein the phosphorus-containing acrylic monomer includes a diphenyl phosphate material.

* * * * *